US011107092B2

(12) United States Patent
Sheth et al.

(10) Patent No.: US 11,107,092 B2
(45) Date of Patent: Aug. 31, 2021

(54) CONTENT INSIGHT SYSTEM

(71) Applicant: Sprinklr, Inc., New York, NY (US)

(72) Inventors: Devarsh Sheth, Gurgaon (IN); Noman Ahmed Sheikh, Gurgaon (IN); Vasant Srinivasan, Gurugram (IN); Pavitar Singh, Gurugram (IN)

(73) Assignee: SPRINKLR, INC., New York, NY (US)

(*) Notice: Subject to any disclaimer, the term of this patent is extended or adjusted under 35 U.S.C. 154(b) by 141 days.

(21) Appl. No.: 16/251,934

(22) Filed: Jan. 18, 2019

(65) Prior Publication Data

US 2020/0234313 A1 Jul. 23, 2020

(51) Int. Cl.
*G06Q 30/02* (2012.01)
*G06Q 50/00* (2012.01)
*G06F 16/951* (2019.01)

(52) U.S. Cl.
CPC ....... *G06Q 30/0201* (2013.01); *G06F 16/951* (2019.01); *G06Q 30/0282* (2013.01); *G06Q 50/01* (2013.01)

(58) Field of Classification Search
CPC ............ G06Q 10/00–50/00; G06F 1/00–40/00
USPC ................................................ 705/7.11–7.42
See application file for complete search history.

(56) References Cited

U.S. PATENT DOCUMENTS

| | | | | |
|---|---|---|---|---|
| 6,078,924 A * | 6/2000 | Ainsbury | ............... | G06F 16/951 |
| 7,720,835 B2 * | 5/2010 | Ward | ...................... | G06Q 30/02 |
| | | | | 707/710 |
| 7,877,345 B2 * | 1/2011 | Nigam | ................... | G06Q 30/02 |
| | | | | 706/55 |
| 9,105,036 B2 * | 8/2015 | Mass | ...................... | G06Q 30/02 |
| 10,140,646 B2 * | 11/2018 | Parveen | ............... | G06F 40/134 |
| 10,229,090 B2 * | 3/2019 | Mosley | ................. | G06Q 50/01 |
| 10,509,863 B1 * | 12/2019 | Arfa | ..................... | G06K 9/6232 |
| 10,685,183 B1 * | 6/2020 | Arfa | ........................ | H04L 51/14 |
| 2004/0059736 A1 * | 3/2004 | Willse | .................... | G06F 40/20 |
| 2006/0129446 A1 * | 6/2006 | Ruhl | ..................... | G06F 16/951 |
| | | | | 705/306 |
| 2007/0244888 A1 * | 10/2007 | Chea | ..................... | G06Q 30/02 |
| 2007/0294281 A1 * | 12/2007 | Ward | ..................... | G06Q 30/02 |
| 2008/0133488 A1 * | 6/2008 | Bandaru | ............... | G06F 16/951 |
| 2008/0154883 A1 * | 6/2008 | Chowdhury | .......... | G06F 40/258 |
| 2009/0164417 A1 * | 6/2009 | Nigam | .................. | G06F 40/253 |
| 2009/0282019 A1 * | 11/2009 | Galitsky | ............... | G06F 40/279 |

(Continued)

OTHER PUBLICATIONS

Redmon, et al., "YOLOv3: Art incremental Improvement", Dec. 23, 2018, University of Washington; URL: https://web.archive.org/web/20181223120043/https://pjreddie.com/media/files/papers/YOLOv3.pdf>; 6 pages.

(Continued)

*Primary Examiner* — Alan S Miller

(74) *Attorney, Agent, or Firm* — Schwabe Williamson & Wyatt

(57) ABSTRACT

An insight system identifies brands, subjects, attributes, and the sentiment conveyed for those attributes. The insight system pairs the attributes with the subjects and brands and generates metrics based on the sentiments associated with the attributes. The insight system may parse product webpages linked to the content for brand identifiers and associate the brand identifiers with the brands. The insight system provides more granular insight into user sentiment for different features associated with the brands.

20 Claims, 10 Drawing Sheets

(56) References Cited

U.S. PATENT DOCUMENTS

| | | | |
|---|---|---|---|
| 2009/0319342 A1* | 12/2009 | Shilman | G06Q 30/02 705/7.41 |
| 2010/0094878 A1* | 4/2010 | Soroca | G06Q 30/02 707/748 |
| 2010/0262454 A1* | 10/2010 | Sommer | G06Q 30/02 706/20 |
| 2011/0258049 A1* | 10/2011 | Ramer | G06Q 30/0273 705/14.66 |
| 2012/0179752 A1* | 7/2012 | Mosley | G06F 16/951 709/204 |
| 2013/0290142 A1* | 10/2013 | Croes | G06Q 30/0625 705/26.61 |
| 2013/0304581 A1* | 11/2013 | Soroca | G06Q 30/0267 705/14.64 |
| 2015/0066803 A1* | 3/2015 | Aneja | G06Q 30/0282 705/347 |
| 2015/0262313 A1 | 9/2015 | Shah et al. | |
| 2016/0063093 A1* | 3/2016 | Boucher | G06F 16/90324 707/748 |
| 2016/0117737 A1* | 4/2016 | Sinha | G06Q 30/0245 705/14.44 |
| 2016/0179959 A1* | 6/2016 | Mosley | G06F 16/951 707/722 |
| 2016/0267377 A1* | 9/2016 | Pan | G06Q 30/0201 |
| 2017/0068648 A1* | 3/2017 | Parveen | G06F 40/134 |
| 2019/0115008 A1 | 4/2019 | Jiang et al. | |
| 2019/0317994 A1 | 10/2019 | Singh et al. | |
| 2020/0004825 A1 | 1/2020 | Pasternack et al. | |
| 2020/0167417 A1 | 5/2020 | Li et al. | |

OTHER PUBLICATIONS

Szegedy et al., "Rethinking the inception Architecture for Computer Vision", Cornell University, Dec. 11, 2015; URL: https://arxiv.org/abs/1512,00567; 10 pages.

Wikipedia "Dependency Grammar", Dec. 26, 2016, URL: https://web.archive.org/web/20181228023401/https://en.wikipedia.org/wiki/Dependency_grammar; 8 pages.

Wikipedia "Big Five Personality Trains", Dec. 28, 2018; URL: https://web.archive.org/web/20181228053946/https://en.wikipedia.org/wiki/Big_Five_personaiity_traits>; 39 pages.

Wikipedia "Named-entity Recognition", Dec. 28, 2018; URL: https://web.archive.org/web/20181228221205/https://en.wikipedia.org/wiki/Named-entity_recognition; 6 pages.

Dong-Guk Shin, An expectation-driven response understanding paradigm, in IEEE Transactions on Knowledge and Data Engineering, vol. 6, No. 3, pp. 430-443, Jun. 1994, doi: 10.1109/69.334859 (1994).

* cited by examiner

DETECT SENTIMENT ON ATTRIBUTES 164

Apparently I am one of the few who had to pay for this razor, however, I feel I can give an objective review. First of all this razor is quiet NOISE LEVEL_POSITIVE, much quieter NOISE LEVEL_POSITIVE than my foil shaver. Secondly I feel it offers a faster shave SPEED_POSITIVE than my Acme series 7 even as I struggle to adapt to a new shaving methodology SKIN ADAPTATION_NEGATIVE. The quality of shave EFFICIENCY (CLOSENESS)_POSITIVE (closeness) is about the same as my Acme. The cleaning station CLEANING STATION is OK GENERAL QUALITY_NEUTRAL, it's larger SIZE_NEGATIVE than the Acme cleaning station CLEANING STATION – plus it is much quieter NOISE LEVEL_POSITIVE." Update: June 14, 2016 – The FastClean unit CLEANING STATION stopped drying which results in a cold wet next shave. There are not a lot of warranty options WARRANTY_NEGATIVE for a repair. Minus 2 stars.

FIG. 5C

DETECT BRANDS 166

Apparently I am one of the few who had to pay for this razor, however, I feel I can give an objective review. First of all this razor is quiet; much quieter than my foil shaver. Secondly I feel it offers a faster shave than my [ACME] series 7 even as I struggle to adapt to a new shaving methodology. The quality of shave (closeness) is about the same as my [ACME]. The cleaning station is OK, it's really not any larger than the [ACME] cleaning station – plus it is much quieter[.",", Update: June 14, 2016 – The FastClean unit stopped drying which results in a cold wet next shave. There are not a lot of warranty options for a repair. Minus 2 stars.

MERGE BRAND AND ATTRIBUTE
SENTIMENT COMPONENTS 168

Apparently I am one of the few who had to pay for this razor, however, I feel I can give an objective review. First of all this razor is [quiet NOISE_LEVEL_POSITIVE], [much quieter NOISE_LEVEL_POSITIVE] than my foil shaver. Secondly I feel it offers a faster shave [SPEED POSITIVE] than my Acme_ACME series 7 even as I struggle to adapt to a new shaving methodology [SKIN_ADAPTATION NEGATIVE]. The [quality of shave EFFICIENCY (CLOSENESS) POSITIVE] (closeness) is about the same as my [Acme_ACME]. The [cleaning station CLEANING STATION] is Ok GENERAL QUALITY NEUTRAL, it's [really not any large SIZE NEGATIVE] than the [Acme_ACME] – plus it is [much quieter NOISE_LEVEL_POSITIVE]", Update: June 14, 2016 — The FastClean unit CLEANING STATION stopped drying which results in a cold wet next shave. There are [quite a lot of warranty gripes WARRANTY NEGATIVE] for a repair. Minus 2 stars.

| BRAND | SUBJECT | ATTRIBUTE | SENTIMENT | PHRASE |
|---|---|---|---|---|
| ACME | | NOISE LEVEL | POSITIVE | QUIET |
| ACME | | NOISE LEVEL | POSITIVE | MUCH QUIETER |
| ACME | | SPEED | POSITIVE | OFFERS A FASTER SHAVE |
| ACME | | SKIN ADAPTATION | NEGATIVE | STRUGGLES TO ADAPT TO A NEW SHAVING METHODOLOGY |
| ACME | | EFFICIENCY (CLOSENESS) | POSITIVE | QUALITY OF SHAVE |
| ACME | CLEANING STATION | GENERAL QUALITY | NEUTRAL | OK |
| ACME | CLEANING STATION | SIZE | NEGATIVE | NOT REALLY ANY LARGER |
| ACME | | WARRANTY | NEGATIVE | NOT A LOT OF WARRANTY OPTIONS |

FIG. 5F

CONTENT INSIGHT SYSTEM

BACKGROUND

Users go to a website and rate a product by entering a discrete number, number of stars, thumbs up, like, etc. Rating systems used on these websites produce a single overall rating for the product. Thus, the product manufacturer has little insight into the factors considered by users that resulted in the overall product rating.

Users also may post text reviews of products and engage with other users by commenting, liking the post, or rebroadcasting the post to their friends and followers. For example, users on social media networks, such as Twitter®, may post Tweets reviewing a product. However, the product manufacture has no insight into the overall rating for the non-structured reviews, much less, detailed insight into which features of the product are liked and disliked by the reviewers.

DETAILED DESCRIPTION

An insight system identifies brands, subjects, attributes, and the sentiment conveyed for those attributes. The insight system pairs the attributes with the subjects and brands and generates metrics based on the sentiments associated with the attributes. The insight system provides more granular insight into user sentiment for different features associated with the brands.

Figure 1:
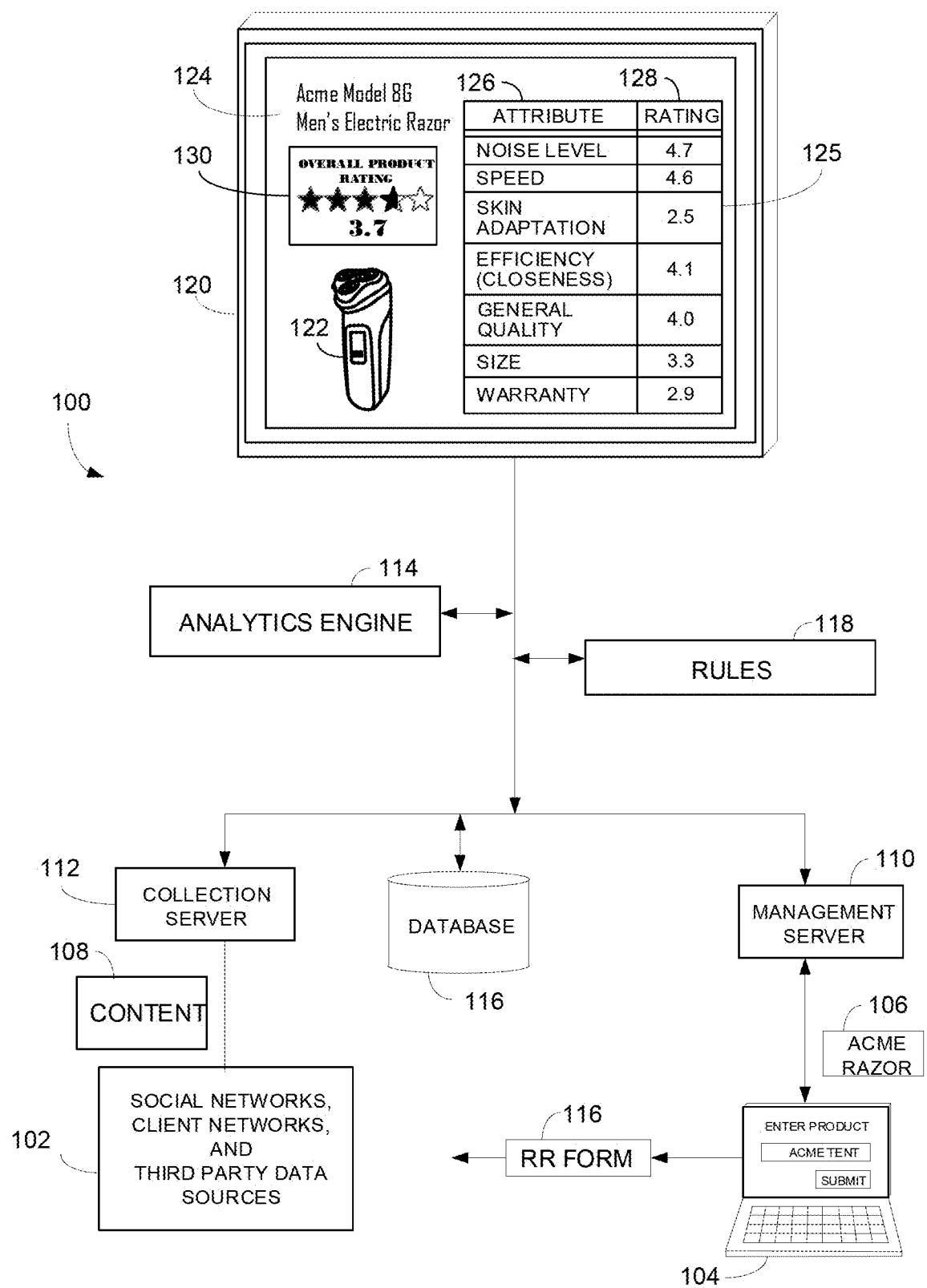
FIG. 1 depicts an example insight system.

FIG. 1 shows an insight system 100 that accesses content 108 from different data sources 102, such as social networks, company networks, and third-party websites. Social networks 102 may include websites, such as Twitter®, Facebook®, Instagram®, YouTube®, or the like.

Client networks 102 may include websites for a company, individual, or other entity. For example, client networks 102 may include the www.acme.com website and other Acme company databases. In another example, client networks 102 may include other websites used for selling products, such as Amazon.com®. In one example, client networks 102 may operate software applications, such as those provided by Bazaarvoice® and PowerReviews® that generate structured ratings for associated products.

Third party data sources 102 may include data on websites such as Adobe® or Google® analytics that monitor, measure, and generate metrics for other data sources or websites. Another example third party data source may include customized databases, such as created by Salesforce®, Salesforce® Radian6, or Sysomos® that provide access to marketing and sales data.

The term content referred to below may include any message, posting, article, review, social media, internal or external research data, text, audio, video, icons, emoji, or any other data used for describing or reviewing a product, service, person, place, or any other thing.

A computer 104, such as a laptop, personal computer, notebook, or smart device, identifies what data to extract from data sources 102. For example, an operator may enter a keyword, data string, term, or any other combination of characters into computer 104 associated with a particular subject, data category, content, product, service, event, label, hashtag, etc., referred to generally below as a topic 106.

For example, topic 106 may comprise the name of company or person, a name of a product or service, a brand name, a model number for a product sold under the brand name, a name for a campaign or event associated with a company or person, a name of a department within a company, a name of an account on a social website, a name of a subject or account, a hashtag associated with the person or company, a name of a competitor or competitive product, etc.

In addition to identifying topic 106, an operator may identify via computer 104 which networks 102 to use for extracting associated content 108. For example, the operator may identify the Acme.com website, Amazon.com®, Twitter®, YouTube®, Facebook®, and Instagram®.

The operator may submit topic 106 to a management server 110. Management server 110 then directs collection server 112 to extract content 108 from selected data sources 102 associated with topic 106. Management server 110 also may direct an analytics engine 114 to connect to data sources 102 and access any other streaming data associated with topic 106.

Collection server 112 may use application programmer interfaces (APIs) to extract content 108 associated with topic 106 from data sources 102. For example, collection server 112 may use APIs to extract posts from social networks that discuss topic 106 or that contain pictures or videos associated with topic 106. Collection server 112 also may extract content from webpages and customer reviews on the Acme.com website associated with topic 106. Content 108 from all of the different data sources 102 is stored in a database 116.

The operator may use computer 104 to create rules 118 that identify which network or website sources 102 to extract content 108, which content 108 to extract from sources 102, and what content and associated metrics to calculate and display for content 108 that relates to topic 106. For example, rules 118 may direct analytics engine 114 to accumulate all web traffic associated with topic 106 and generate certain metrics and associated graphs for different selectable time periods, such as every 30 minutes, every hour, every day, week, etc.

Topic Attributes

Insight system 100 may identify different attributes associated with the same topic 106. For example, analytics engine 114 may extract content 108 from database 116 associated with a topic 106, such as an Acme razor. As mentioned above, content 108 may include user text messages and user postings reviewing the Acme razor. Analytics engine 114 identifies subjects and attributes in content 108 and sentiments for the identified attributes.

Analytics engine 114 identifies brands associated with the subjects and attributes. For example, brands may be company names, product names, product model numbers, or any other identifier of a product, service, campaign, event, company, hashtag, or any other thing may might be reviewed by users. Analytics engine 114 may identify the brand in user reviews or in webpages linked to the user reviews. Analytics engine 114 then pairs the attributes with the subjects and brands and generates metrics for the brands and brand attributes based on the associated sentiments.

Insight system 100 may display the brand and associated metrics on a computer screen 120. For example, insight system 100 may display an image of the selected topic or product 122 and identify a name and model number 124 of the selected topic or product, such as the Acme razor model 8G.

Insight system 100 also may display metrics associated with product 122. For example, insight system 100 may display a table 125 that identifies different attributes 126 associated with product 122 identified by analytics engine 114.

Insight system 100 also may display ratings 128 for attributes 126. For example, analytics engine 114 identifies the sentiment for each attribute 126. Analytics engine 114 then may convert the identified sentiments into numerical ratings 128. For example, analytics engine 114 may assign a positive sentiment for a particular attribute 126 a value of 5, assign a negative attribute a value of 0, and assign a neutral sentiment a value of 2.5. Analytics engine 114 then may average all of the ratings for the same attribute 126 together to generate a rating 128 for each attribute 126.

Analytics engine 114 may calculate an overall product rating 130 for product 122 based on individual attribute ratings 128. For example, analytics engine 114 may average together attribute ratings 128 to generate overall product rating 128.

Analytics engine 114 may assign different weightings to attributes 126 based on the number of messages containing the attribute, or based on any other criteria specified in rules 118. Analytics engine 114 then may average the weighted attribute ratings 128 together to generate overall product rating 130.

Insight engine 100 provides more granular insight into user sentiment for product 122. Identifying different attributes 126 and associated sentiment for the same product 122 provides the product manufacturer with more information regarding the specific features of product 122 that positively contributed to overall product rating 130 and the specific features that negatively contributed to overall rating 130. In addition, rating, weighting, and averaging individual attributes 126 may produce a more accurate overall product rating 130.

Figure 2:
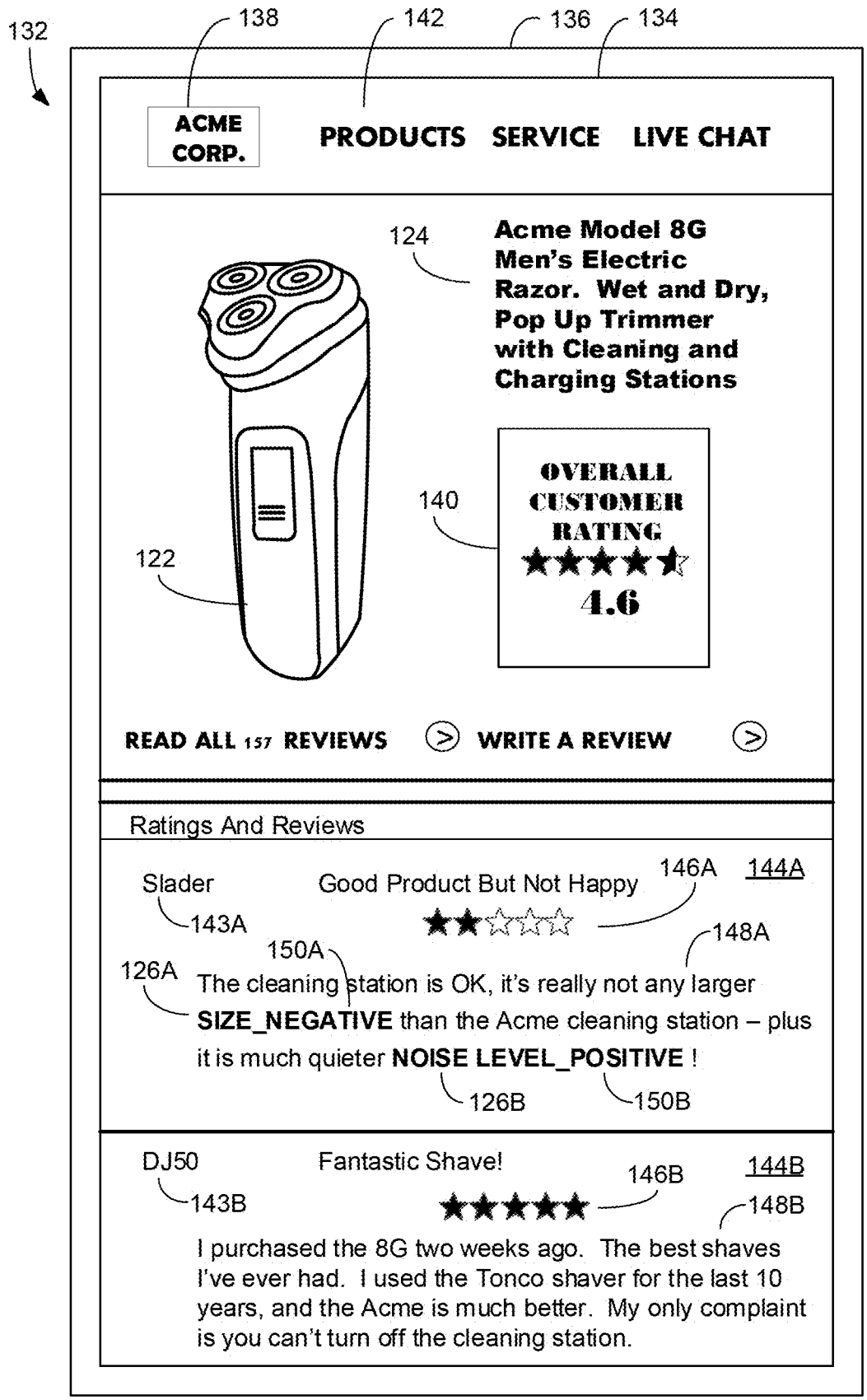
FIG. 2 depicts a product webpage used by the insight system to identify different product attributes and sentiments.

FIG. 2 shows example content 132 insight system 100 uses for generating at least some of attributes 126 and ratings 128 described above in FIG. 1. In this example, content 132 may include a product webpage 134 on a website 136 operated by a company 138. However, content 132 may be any webpage 134 on any website 136 that sells or describes any product 122 or any other item. For example, the same product 122 also may be displayed and sold on the Amazon.com website.

Referring to FIGS. 1 and 2, product webpage 134 may include an image of product 122, a textual description 124 of product 122 that may include a model number, and possibly an overall customer rating 140 of product 122. Product webpage 132 may include other links 142 to other products and services provided by company 138.

Content 132 also may include customer reviews 144 of product 122. For example, a user 143A may post a customer review 144A that includes a rating 146A for product 122 and a textual review 148A of product 122. A second user 143B may generate a customer review 144B that includes a rating 146B for product 122 and a textual review 148B of product 122. As explained above, this is just one example of content insight system 100 uses to identify attributes 126 and associated ratings 128 shown above in FIG. 1.

Insight system 100 parses product webpage 134 to identify product 122 and associated model number 124. Insight system 100 may display product 122 and model number 124 on computer screen 120 as shown above in FIG. 1.

In one example, insight system 100 also may capture and use overall customer rating 140 from product webpage 134 when calculating attribute ratings 128 and overall product rating 130 in FIG. 1. For example, insight system 100 may independently generate product rating 130 in FIG. 1 based on independently generated attribute ratings 128 in FIG. 1. However, insight system 100 may adjust any calculated attribute ratings 128 or product rating 130 by some amount based on any customer rating 140 identified on product webpage 134.

Insight system 100 identifies different attributes 126 of product 122 in customer reviews 144. For example, insight system 100 may identify an attribute 126A in customer review 144A associated with the size of razor 122 and identify a second attribute 126B in review 144A associated with a noise level of razor 122. Insight system 100 also identifies sentiment 150A associated with attribute 126A and sentiment 150B associated with attribute 126B and may use the identified sentiments 150A and 150B to generate associated ratings 128 for attributes 126A and 126B, respectively.

Insight system 100 may combine attributes 126 and associated sentiments 150 identified in different reviews 144 from product webpage 134 on product website 136 with other user reviews on any other websites. For example, insight system 100 may identify noise level attribute 126B and associated sentiments 150B for different consumer reviews of product 122 from multiple different websites. Insight system 100 then may calculate and display the average for all of the identified noise level sentiments 150B.

Insight system 100 may display attributes 126 in order based on different selectable parameters. For example, insight system 100 may display attributes 126 in table 125 in order based on the number of customer reviews 144 containing attribute 126. In this example, noise level attribute 126B may have had the largest number of customer reviews 144 and size attribute 126A may have had the sixth largest number of customer reviews 144.

Insight system 100 also may weight each attribute rating 128 based on the number of customer reviews 144. For example, each rating 128 may be multiplied by a value proportional to the number of customer reviews 144 containing associated attribute 126. Insight system 100 then may average the weighted ratings 128 together to derive overall product rating 130.

Figure 3:
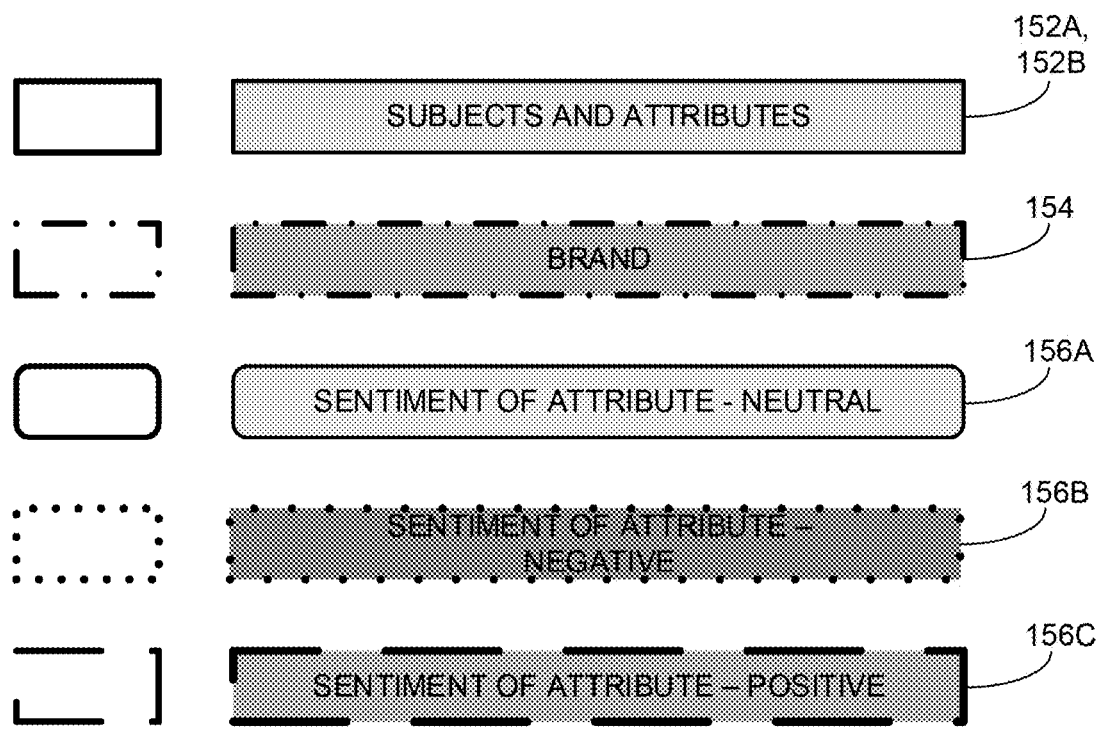
FIG. 3 depicts a legend showing different items identified by the insight system.

FIG. 3 is a legend showing different items identified by insight system 100. Grey solid line boxes 152A and 152B indicate subjects and attributes, respectively, identified by insight system 100. A blue dot-and-dash box 154 indicates brands identified by insight system 100. A yellow rounded corner box 156A indicates a neutral attribute sentiment identified by insight system 100. An orange dotted line box 156B indicates a negative attribute sentiment identified by insight system 100. A green dashed line box 156C indicates a positive attribute sentiment identified by insight system 100.

Figure 4:
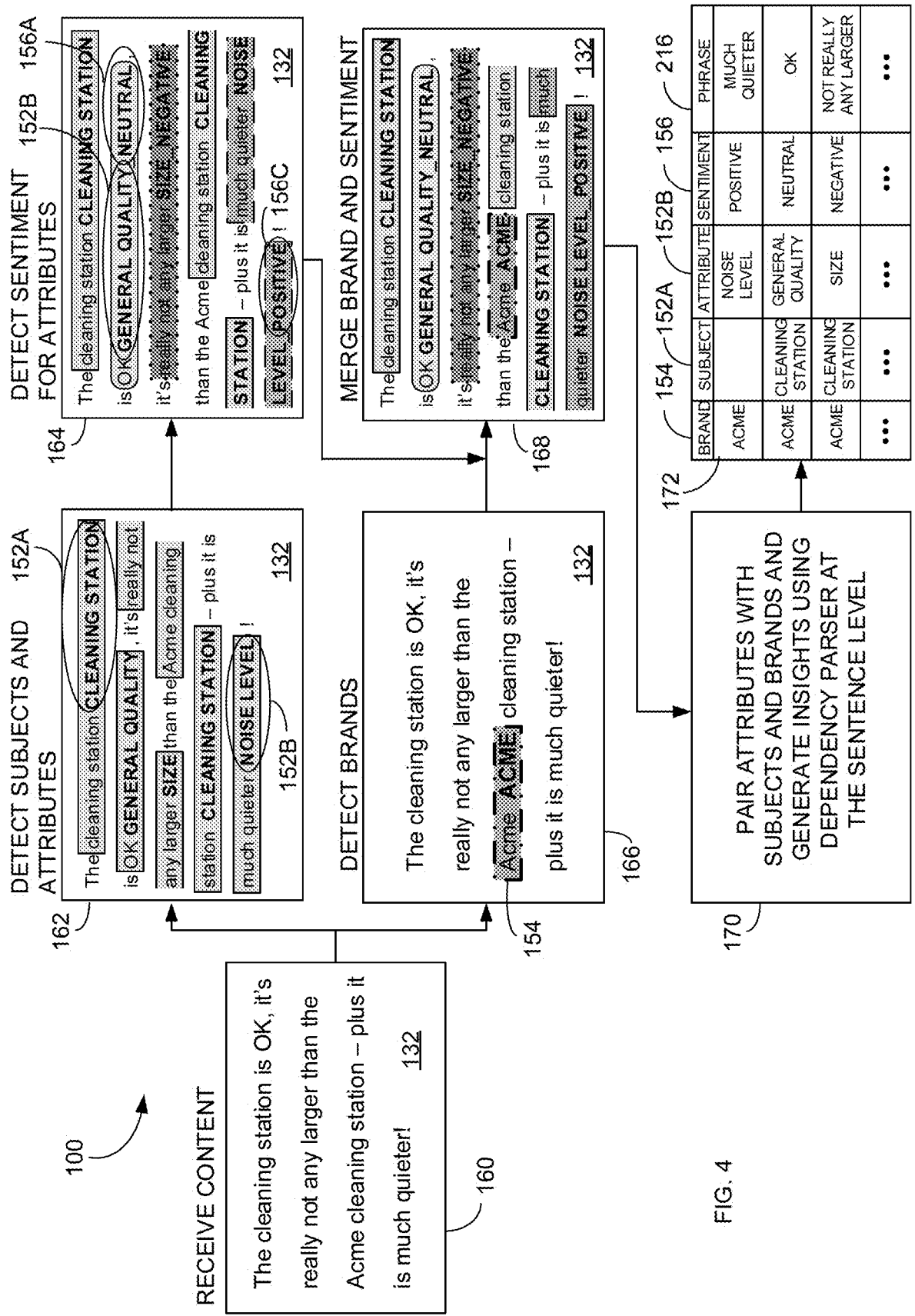
FIG. 4 depicts a process for identifying and pairing content items.

FIG. 4 is a flow diagram showing in more detail how insight system 100 identifies items in content 132. In operation 160, insight system 100 receives content 132. As explained above, insight system 100 may use APIs to down load content 132 from any number of websites. In this example, content 132 is a user review of shaver 122 described above in FIG. 2. Of course, content 132 may describe with any person, place, or thing.

In operation 160, insight system 100 detects subjects 152A and attributes 152B in content 132. For example, insight system 100 may identify the phrase "cleaning station" as CLEANING STATION subject 152A and also identify the phrase "Acme cleaning station" as CLEANING STATION subject 152A.

Insight system 100 may identify the phrases "OK" as a GENERAL QUALITY attribute 152B, "really not any larger" as a SIZE attribute 152B, and "much quieter" as a NOISE LEVEL attribute 152B.

One example algorithm that identifies subjects 152A and attributes 152B is a named entity recognition algorithm, such as described at https://en.wikipedia.org/wiki/Named-entity_recognition which is herein incorporated by reference in its entirety.

Operation 164 may detect sentiment for attributes 152B. For example, the phrase "OK" identified as GENERAL QUALITY attribute 152B is also identified as having a NEUTRAL sentiment 156A. The phrase "really not any larger" identified as a SIZE attribute is also identified as having a NEGATIVE sentiment 156B. The phrase "much quieter" identified as a NOISE LEVEL attribute is also identified as having a POSITIVE sentiment 156C.

Operation 166 may detect brands 154 in content 132. For example, insight system 100 may identify the phrase "Acme" as ACME brand 154. Insight system 100 may identify the phase "Acme" is brand 154 based on the usage of the phrase in content 132. Insight system 100 also may identify the phrase "Acme" as brand 154 based on its use on product webpage 134 in FIG. 2.

As explained above, insight system 100 may parse product webpage 134 and identify any brand name, product name, model number, stock keeping unit (SKU), or any other product identifier associated with content 132. Insight system 100 then may link the product identifier with brand 154, subjects 152A, and attributes 152B identified in content 132. Insight system 100 may use the named entity recognition algorithm described above to also identify brands 154 in content 132.

Insight system 100 in operation 168 merges brands 154 identified in operation 166 with subjects 152A, attributes 152B, and sentiments 156 identified in operations 162 and 164. For example, insight system 100 may generate a file that includes content 132 and the assigned subjects 152A, attributes 152B, sentiments 156, and brands 154.

Insight system 100 in operation 170 pairs the identified attributes 152B with identified subjects 152A and brands 154. For example, insight system 100 may use a dependency parser to create a dependency tree that analyzes the grammatical structure of the sentences in content 132 and establishes relationships between head words and words which modify those head words.

A first stage of pairing operation 170 may pair subjects 152A with attributes 152B. A second stage of pairing operation 170 may pair the subject/attribute pairings with an identified brand 154. Some attributes 152B may not be paired with any subject 152A and alternatively are paired directly to brand 154. For example, content 132 may include the sentence, "I don't like Acme shavers." The dependency tree may pair the attribute "do not like" directly with brand Acme.

Pairing operation 170 may use conference resolution where a first sentence may refer to brand 154 and other related sentences use pronouns instead of brand 154. Conference resolution finds all of the words that refer to the same item. One example dependency parser that pairs attributes 152B with subjects 152A and brands 154 is described at http://en.wikipedia.org/wiki/Dependency_grammar which is herein incorporated by reference in its entirety.

The pairings performed by insight system 100 in operation 170 produce tables 172 that list all of the subjects 152A, attributes 152B, and sentiments 156 associated with a same brand 154. Insight system 100 may generate multiple tables 172 each associated with a different brand, product, item, etc. identified in the same or different content 132. Insight system 100 may merge the tables 172 generated from different content 132 associated with the same brand, product, or other item.

As mentioned above, insight system 100 may generate ratings for each attribute 152B based on identified sentiments 156. For example, insight system 100 may assign a 2.5 rating to a neutral sentiment 156A, a zero rating to a negative sentiment 156B, and a 5 rating to a positive sentiment 156C.

Insight system 100 may average the assigned ratings from different content together to derive one rating 128 for each attribute 152B as shown above in FIG. 1. Of course, insight system 100 may identify other sentiment levels and use other algorithms for ratings attributes 152B.

In one example, insight system 100 may use different models to perform operations 162-170 and use training data to train the models. For example, a first set of training data may include content related to the food and beverage industry, a second set of training data may include content related to the consumer product industry, and a third set of training data may include content related to the automobile industry.

Each set of training data may include known brands, subjects, attributes, sentiments and associated pairings. The entity recognition model used in operations 162 and 166 and the dependency parser model used in operation 170 are trained using the known training data for a selected industry and then used for generating tables 172.

Figure 5:
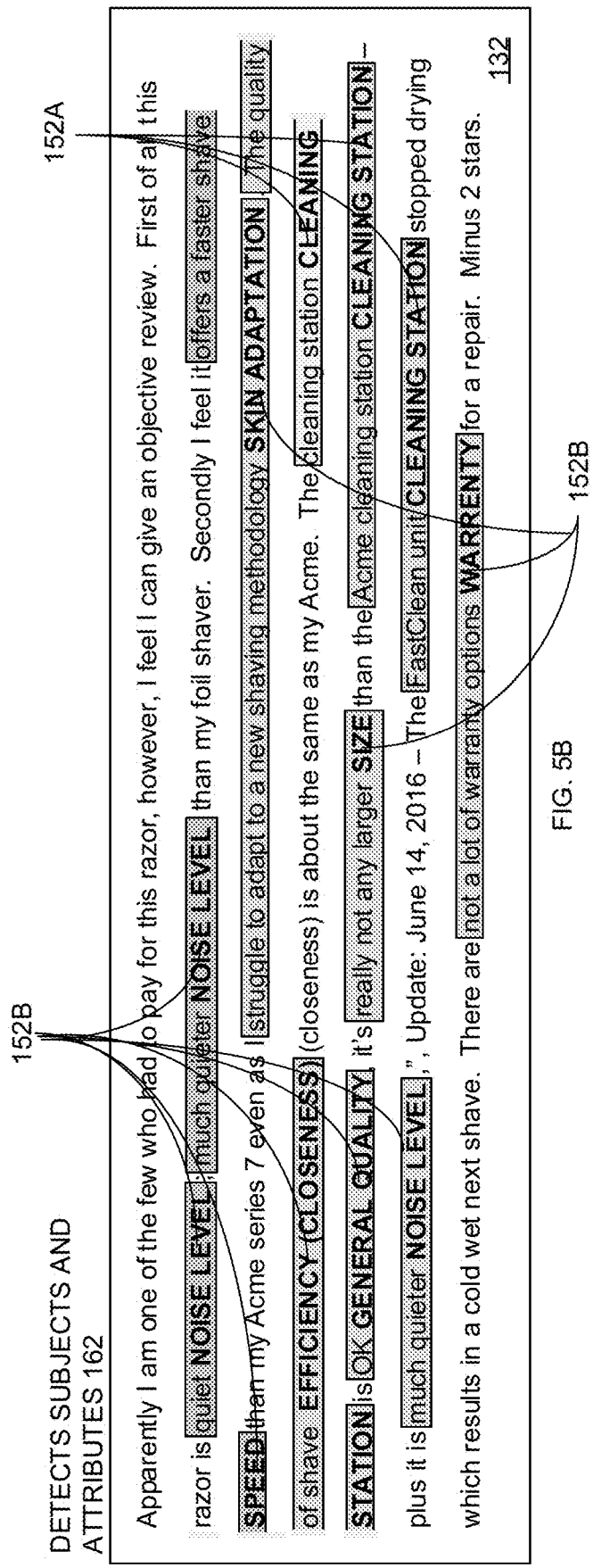
FIG. 5A depicts example content for a product review.
FIG. 5B depicts example subjects and attributes identified in the product review.
FIG. 5C depicts example sentiments identified in the product review.
FIG. 5D depicts example brands identified in the product review.
FIG. 5E depicts example brands, subjects, attributes, and sentiments merged in the product review.
FIG. 5F depicts an example table showing the brand paired with the subjects, attributes, and sentiments.

FIG. 5A shows in more detail content 132 received in operation 160 from product webpage 134. As mentioned above, content 132 may be any review, posting, article, etc. that describes a product. FIG. 5B shows operation 162 in more detail where subjects 152A and attributes 152B are identified in content 132.

FIG. 5C shows operation 164 in more detail where sentiments 156A, 156B, and 156C are identified for attributes 152B. FIG. 5D shows operation 166 in more detail where brands 154 are identified in content 132. FIG. 5E shows operation 168 in more detail where subjects 152A, attributes 152B, sentiments 156, and brands 154 are merged together in content 132.

FIG. 5F shows in more detail the pairing operation 170 that produces table 172. Operation 170 pairs brand 154 with subjects 152A, attributes 152B, and sentiments 156. Table 172 also may identify phrases 176 used by insight system 100 to identify attributes 152B and associated sentiments 156.

Again, insight system 100 may combine data from different tables 172 generated from different content 132. Insight system 100 then may generate any user selectable metric from the combined tables 172. For example, an employee of brand 154 may direct insight system 100 to display the 10 highest rated attributes 152B and the 10 lowest rated attributes 152B.

As also explained above, insight system 100 may identify attributes and generate associated ratings for any user selectable time period. For example, a user may direct insight system 100 to identify attributes and generate associated ratings for content generated over the last month.

Insight system 100 then accesses content generated over the last month and generates tables 172 as described above. Insight system 100 then may generate graphs that show daily changes in attributes 152B and associated ratings 128 over the last month. In another example, insight system 100 may automatically notify an employee of brand 154 when ratings for any of attributes 152B drop below or rises above selectable threshold levels.

Hardware and Software

Figure 6:
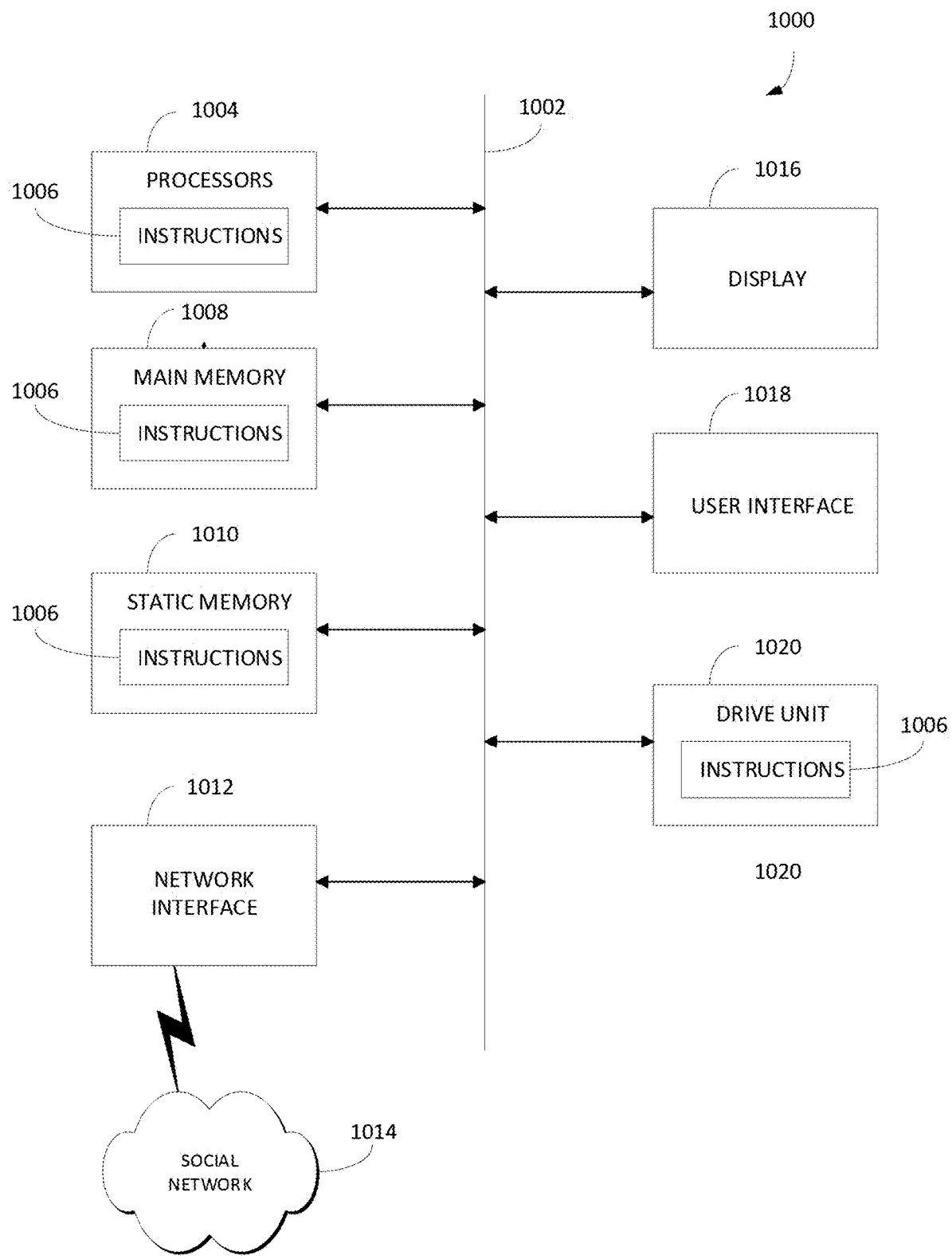
FIG. 6 depicts an example computing device used in the insight system.

FIG. 6 shows a computing device 1000 that may be used for operating insight system 100 and performing any combination of operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the same corresponding time period.

The invention claimed is:

1. An apparatus including a hardware processor, the apparatus comprising:
    a set of instructions that, when executed by the hardware processor, cause the hardware processor to:
        parse non-structured data from webpages;
        identify subjects in the non-structured data;
        identify attributes in the non-structured data;
        individually identify sentiments for the attributes, respectively, wherein individually identify sentiments includes detecting sentiments in the non-structured data and individually associating the detected sentiments in the non-structured data with the identified attributes;

identify brands in the non-structured data;

pair the attributes with the subjects and brands using information taken from the non-structured data, wherein the pair the attributes with the subjects and brands produces structured data for the paired brands, subjects, and attributes, wherein the structured data is based on the sentiments individually identified for the attributes.

2. The apparatus of claim 1, wherein the instructions when executed by the hardware processor are further configured to display metrics for the paired brands, subjects, and attributes on a user interface, wherein the metrics are based on the structured data.

3. The apparatus of claim 1, wherein the instructions when executed by the hardware processor are further configured to:

parse product webpages linked to content of the webpages for product identifiers; and associate the product identifiers with the brands.

4. The apparatus of claim 3, wherein the product identifiers include at least one of a product name or a product model number.

5. The apparatus of claim 1, wherein at least some of the non-structured data is taken from social media posted on websites reviewing the brand.

6. The apparatus of claim 1, wherein the instructions when executed by the hardware processor are further configured to use an entity recognition algorithm to identify the subjects, attributes, and brands in the non-structured data.

7. The apparatus of claim 1, wherein pair the attributes with the subjects and brands using information taken from the non-structured data is performed using a series of stages, wherein in one stage of the series of stages the subjects are paired with the attributes using the information taken from the non-structured data, and wherein in a second subsequent stage of the series of stages subject/attribute pairings are paired with the brands using the information taken from the non-structured data, wherein the instructions when executed by the hardware processor are further configured to use a dependency parser to pair the attributes with the subjects and brands.

8. The apparatus of claim 2, wherein the instructions when executed by the hardware processor are further configured to display a table on the user interface, wherein the table includes a column for each of:

the brands;

the subjects paired with the brands;

the attributes paired with the brands and the subjects; and sentiments associated with the attributes.

9. The apparatus of claim 1, wherein the brands comprise one or more of a name, model number, or identifier of a product or service.

10. A processing system for identifying attributes of a topic, comprising:

a processing device configured to:

receive social media;

identify subjects and attributes in non-structured data of the social media;

individually identify sentiments for the attributes, respectively, wherein individually identify sentiments includes detecting sentiments in the non-structured data and individually associating the detected sentiments in the non-structured data with the identified attributes;

identify topics in the non-structured data, the topics associated with the subjects and attributes;

pair the attributes with the subjects and topics using information taken from the non-structured data, wherein the pair the attributes with the subjects and topics produces structured data for the paired topics, subjects, and attributes, wherein the structured data is based on the sentiments individually identified for the attributes.

11. The processing system of claim 10, wherein the processing device is further configured to:

individually rate the attributes based on the sentiments, respectively; and display the individually rated attributes in a table.

12. The processing system of claim 11, wherein the processing device is further configured to:

rank the attributes based on the individual ratings; and display the ranked attributes in the table.

13. The processing system of claim 12, wherein the processing device is further configured to:

derive an overall rating based on the individual ratings of the attributes, wherein the overall rating is associated with at least one of the topics.

14. The processing system of claim 10, wherein the processing device is further configured to generate, over selectable time periods, metrics based on the structured data.

15. The processing system of claim 10, wherein the processing device is further configured to:

parse product webpages linked to content corresponding to the non-structured data for product identifiers; and associate the product identifiers with the topics.

16. The processing system of claim 15, wherein at least some of the non-structured data is taken from reviews of the topics posted on the product webpages.

17. The processing system of claim 10, wherein the processing device is further configured to generate a table identifying a column for each of:

the topics;

the subjects paired with the topics;

the attributes paired with the topics and the subjects; and sentiments associated with the attributes;

wherein processing device is further configured to display the table on a user interface.

18. The processing system of claim 10, wherein the topics include a name, a model number, or an identifier of a person, product, or service.

19. An apparatus including a hardware processor, the apparatus comprising:

a memory storing a set of instructions that, when executed by a hardware processor, cause the hardware processor to:

identify products;

parse non-structured data for subjects and attributes;

individually identify sentiments in the content associated with the attributes, respectively, wherein individually identify sentiments includes detecting sentiments in the non-structured data and individually associating the detected sentiments in the non-structured data with the identified attributes;

pair the products, subjects, and attributes using information taken from the non-structured data, wherein the pair the products, subjects, and attributes produces structured data; and generate a table based on the structured data, the table containing the pairings of the subjects and attributes with the products and the individually identified sentiments associated with the attributes, respectively; and display the table on a user interface.

20. The apparatus of claim 19, wherein the set of instructions, when executed by the hardware processor, further cause the hardware processor to:

identify names of some of the products in the non-structured data containing the subjects, attributes, and sentiments; and identify other names of the products from product webpages linked to content corresponding to the non-structured data.

\* \* \* \* \*